United States Patent [19]

Rossner et al.

[11] Patent Number: 5,518,658

[45] Date of Patent: May 21, 1996

[54] PHOSPHOR HAVING REDUCED AFTERGLOW AND METHOD FOR MANUFACTURING SAME

[75] Inventors: Wolfgang Rossner, Holzkirchen; Christa Grabmaier, Berg; Hermann Boedinger, Puchheim; Juergen Leppert, Inning; Andreas Jahnke, Munich; Wolfgang Schubert, Erlangen, all of Germany

[73] Assignee: Siemens Aktiengesellschaft, Munich, Germany

[21] Appl. No.: 377,260

[22] Filed: Jan. 24, 1995

[30] Foreign Application Priority Data

Jan. 26, 1994 [DE] Germany ............... 44 02 258.1

[51] Int. Cl.$^6$ ............................................. C09K 11/84
[52] U.S. Cl. ........................ 252/301.4 S; 423/263; 423/518
[58] Field of Search ............ 252/301.4 S; 423/263, 423/518

[56] References Cited

U.S. PATENT DOCUMENTS 4,863,882   9/1989   Matsuda et al. ............... 252/301.4 S

FOREIGN PATENT DOCUMENTS 3629180   4/1989   Germany.

OTHER PUBLICATIONS

"A Scintillator $Gd_2O_2S$:Pr, Ce, F for X–Ray Computed Tomography," Yamada et al., J. Electrochem. Soc., vol. 136, No. 9, Sep. 1989, pp. 2713–2716.

Primary Examiner—Melissa Bonner
Attorney, Agent, or Firm—Hill, Steadman & Simpson

[57] ABSTRACT

A phosphor for a high energy radiation detector is formed by a rare earth oxisulfide having the general sum formula $(M_{1-x}Ln_x)_2O_2S$, wherein M is at least one element of the group Y, La and Gd, Ln stands for at least one element of the group Eu, Ce, Pr, Tb, Yb, Dy, Sm and Ho, and whereby $(2\times10^{-1}) \geq x \geq (1\times10^{-6})$, which also contains molybdenum in a proportion between $10^{-1}$ and $10^{-6}$ mol percent for reducing the afterglow of the phosphor.

8 Claims, No Drawings

PHOSPHOR HAVING REDUCED AFTERGLOW AND METHOD FOR MANUFACTURING SAME

BACKGROUND OF THE INVENTION

1. Field of the Invention

The present invention is directed to a phosphor having reduced afterglow, suitable for use in detecting high energy radiation, such as x-rays, and to a method for manufacturing such a phosphor.

2. Description of the Prior Art

Detectors for high energy radiation can be constructed of a phosphor and a photodiode or a photomultiplier. Such detectors have widespread employment in nuclear medicine and in x-ray diagnostics. The phosphor has the function of absorbing the high-energy radiation and emitting visible light as a consequence of this absorption. This visible light can be detected by a photosensitive element, for example a photodiode, a photomultiplier or a light-sensitive film.

Phosphors having only an extremely slight afterglow are required in modern radiation detectors as employed, for example, in x-ray computed tomography in order to achieve an adequately high read-out frequency. Thallium-doped cesium iodide CsI:Tl is a phosphor in widespread use that, for example, still exhibits an afterglow intensity of approximately $10^{-2}$ through $10^{-3}$ of the initial light intensity, for example 30 msec after the high-energy radiation has ceased to be incident on the phosphor. For modern radiation detectors, however, phosphors are required whose afterglow has dropped to less than $10^{-4}$ of the initial intensity after approximately 5 through 10 msec.

Promising phosphors for employment in modern radiation detectors are considered to be the oxisulfides of the rare earths. German OS 36 29 180 discloses a method for manufacturing a phosphor ceramic having the general composition $(Ln_{1-x-y}M_xCe_y)_2O_2S,X$, with Ln=Gd, La or Y; M=Eu,Pr or Tb and X=32 F or Cl with 0<x, y<1.

The pigment powder employed as initial material is thereby filled into a vacuum-tight metal container and is compressed to form a ceramic by isostatic hot-pressing.

It is proposed in an article in J. Electrochem. Soc., Vol. 136, No. 9, September 1989, pages 2713 ff to dope a phosphor ceramic of a rare earth oxisulfide with cerium in order to reduce the afterglow. The light yield of the phosphor is reduced, however, at the same time due to the cerium additive and the phosphor is thus degraded in terms of another important property.

SUMMARY OF THE INVENTION

It is an object of the present invention to specify a phosphor on the basis of a rare earth oxisulfide that has improved or (reduced) afterglow without a simultaneous significant loss in luminous intensity.

The above object is achieved in accordance with the principles of the present invention in a phosphor which is a rare earth oxisulfide with a molybdenum additive.

It has been surprisingly found that even a slight molybdenum doping leads to a large reduction of the afterglow by up to three orders of magnitude. By contrast to known additives for reducing the afterglow, these having caused a reduction in the light yield, an overall light yield that is even slightly improved is achieved with the invention.

The molybdenum additive is effective given rare earth oxisulfides having the general sum formula $(M_{1-x}Ln_x)_2O_2$, wherein M comprises at least one element from the group Y, La and Gd, Ln stands for at least one element of the group Eu, Ce, Pr, Tb, Yb, Dy, Sm and Ho, and wherein $(2\times10^{-1}) \geq x \geq (1\times10^{-6})$.

Ln preferably stands for Ce and at least one further element from the recited group but preferably Tb, Pr or Eu.

Inventively, the molybdenum part in the ceramic amounts to between $1\times10^{-1}$ and $1\times10^{-6}$ mol percent but preferably between $5\times10^{-2}$ and $1\times10^{-5}$ mol percent.

The phosphor of the invention is preferably processed to form highly dense and translucent phosphor ceramic that can be utilized for employment in imaging methods, for example in computed tomography.

The phosphor powder from which the phosphor or the phosphor ceramic is fabricated can be made according to conventional methods. For example, it is possible to manufacture the phosphor powder according to a fluxing process. To that end, the metals contained in the phosphor as oxides, carbonates, chlorides, fluorides, sulfides or other suitable compounds are melted together with sulfur and alkali compounds suitable as a fluxing agent. After the solidification of the melt, this is cleaned and washed in order to remove the alkali compounds utilized as the fluxing agent.

It is also possible to dissolve the metals in the desired ratio and then to precipitate them in a suitable form. The rare earth oxisulfides, for example, can be placed in solution in an oxidized form as hydrogen sulfite complex and can be precipitated as sulfite. In a further step, a reduction of the sulfites to form the desired oxisulfides is then required.

Manufacturing the phosphor powder by precipitation from solution has the advantage that the dopants contained therein in only a slight proportion are uniformly distributed over the entire powder. This guarantees the manufacture of a uniform phosphor ceramic having properties uniformly distributed throughout the ceramic body.

The modified method wherein a rare earth oxisulfide ceramic is precipitated from solution as sulfite and is subsequently reduced to form oxisulfide is disclosed, for example, in U.S. Pat. No. 5,296,163 corresponding to German patent application P 42 24 931.7. Therein, the sulfite powder obtain by precipitation is reduced to oxisulfide in a furnace in a forming gas atmosphere and is subsequently treated in a hydrogen/sulfur vapor atmosphere in a further tempering step. A phosphor powder is obtained with this method that has absolutely no foreign phase inclusions and that has a large specific surface of more than 10 m² per gram (according to BET) in addition to having an exact stoichiometry.

A phosphor powder having the composition of the invention produced according to one of these methods is first ground and possibly homogenized before manufacture of the ceramic. A phosphor ceramic suitable for an imaging method must have a high density of 96% or more with reference to the theoretically maximum density in order to have the required optical purity and translucency. This high density can be achieved, for example, by isostatic hot-pressing of the phosphor powder. To that end, this powder is filled into a container that is gas tight and is manufactured of a deformable metal. This container is then charged with a pressure between 50 and 200 Mpa from all sides at a temperature between 800° and 1700° C.

In a less complicated process, the phosphor powder can be processed into a high-density phosphor ceramic by single-axis hot-pressing. To that end, however, a phosphor powder is required that has a high specific surface of more than 10 $m^2/g$ according to BET. Such a powder could hitherto be obtained only with a method disclosed in the aforementioned U.S. Pat. No. 5,296,163.

The high-density phosphor ceramic is in fact produced with a method that is known except for the molybdenum additive. This, however, does not yet result in a phosphor ceramic improved afterglow compared to known phosphor ceramics material. This effect is inventively achieved by an after-treatment of the finished ceramic. To that end, the finished ceramic is subjected to a tempering under oxidizing conditions. A temperature in the range from 600° through 900° C. is preferably selected. The required tempering time can vary dependent on the oxidizing conditions, particularly on the temperature and on the oxidizing atmosphere, but can also vary dependent on the selected manufacturing process for the phosphor powder. A tempering time between 1 and 100 hours, but usually between 2 and 40 hours, can be required, for example, in air. Tempering in an atmosphere having a higher oxygen content and/or elevated temperature requires shorter tempering times.

The ceramic of the invention has an afterglow that is reduced by up to three orders of magnitude compared to known phosphor ceramics. It is believed that deep energy traps in the phosphor ceramic are converted into shallow energy traps due to the molybdenum additive and the following oxidizing treatment. These shallow traps, however, in turn release the captured charge carriers so quickly that the light contribution to the overall light yield caused as a result can be measured together with the principal signal and the measuring method is no longer disturbed by an excessively long afterglow.

It has also been found that the effect of the invention is reversible when the phosphor ceramic having reduced afterglow is subjected to a renewed tempering (Control temperature treatment) under reducing conditions. The temperature conditions that are thereby selected make it possible to again intensify the afterglow up to its desired value. This can be required, for example, in order to set a number of different batches of a phosphor ceramic to a common, uniform afterglow value.

This renewed tempering can be implemented, for example, in a forming gas atmosphere at temperatures between 600° and 900° C.

The invention shall be set forth in greater detail below with reference to an exemplary embodiment.

A phosphor powder having the gross composition $(Gd_{1-x-y}Ce_xPr_yMo_v)_2O_2S$ is to be manufactured wherein $x=1\times10^{-4}$, $y=3\times10^{-3}$ and $v=2\times10^{-5}$. One proceeds in conformity with the method disclosed in U.S. Pat. No. 5,296,163. To that end, a suitable gadolinium compound, for example gadolinium oxide $Gd_2O_3$, is converted into the corresponding hydrogen sulfite complex:

$$Gd_2O_3 + 6SO_3^{2-} + 6H_3O^+ \rightarrow 2(Gd(SO_3)_3)^{3-} + 9H_2O$$

Sulfur oxide is introduced into the aqueous suspension of, for example, $Gd_2O_3$. A clear solution of the hydrogen sulfite complex arises.

This solution is pumped through a 0.2 μm filter to remove particles. The dopant additives of cerium, praseodymium and molybdenum that are still lacking can now be added at this point in the proper ratio prescribed by the formula. The addition preferably ensues as solution or suspension of the corresponding oxides, sulfides, chlorides, nitrates, carbonates or other suitable compounds of the metals or dopants.

The sulfur dioxide is now driven from the solution, whereby the gadolinium together with the dopants is completely precipitated from the solution as sulfite:

$$2(Gd(SO_3)_3)^{3-} + 6H_3O^+ \rightarrow Gd_2(SO_3)_3 \cdot 3H_2O + 3SO_2 + 6H_2O$$

The overall process, particularly the handling of solid powder, ensues under an inert gas or under a reducing atmosphere in order to prevent an oxidation of the hydrogen sulfite complex or of the solid sulfite to form sulfate.

The dried gadolinium sulfite powder is now heated to, for example, 700° C. in a reducing atmosphere, for example in a forming gas having the composition 80% $N_2$/20% $H_2$. The gadolinium sulfite is thereby reduced to form gadolinium oxisulfide $Gd_2O_2S$.

The reduction of the gadolinium sulfite can also be undertaken with other gases having a reducing effect, for example by introducing carbon monoxide, hydrogen or a forming gas having a different composition. The temperature required for reduction can also be selected between 400° and 800° C.

The phosphor powder obtained in this way has a desired, high specific surface of, for example, 35 $m^2/g$. It can still contain foreign phase inclusions that do not correspond to the recited gross sum formula. This is particularly observed when pure gadolinium oxisulfide is produced in a version of the method and this is only subsequently mixed with suitable compounds of the dopants. A further reduction step can be implemented in this case for completing the stoichiometry, wherein the obtained phosphor powder is exposed to a hydrogen/sulfur vapor atmosphere. The same temperature conditions as in the first reduction step are thereby selected.

In a comparative trial, a further (control) phosphor powder was manufactured with the same method, this being molybdenum-free but otherwise having the same gross formula.

Wafers of phosphor ceramic were manufactured respectively from the inventive and control phosphor powders, for example by single-axis hot-pressing. To that end, the powder is filled into a pressing die and is first pre-pressed cold and dry at a pressure of 50 MPa. Subsequently, heating is carried out initially unpressurized to a temperature of 1100° through 1300° in a hot press, whereby the phosphor powder is sintered to approximately 80 through 85 percent of theoretical density. Only thereafter is the ultimate pressing power of approximately 50 MPa built up and the phosphor powder is completely compressed to form a phosphor ceramic.

The phosphor ceramic bodies taken from the die are now charged with x-radiation under various conditions in order to quantitatively measure their luminescent properties, particularly the afterglow. After this, phosphor ceramic bodies are tempered at 600° through 900° C., for example at 800° C. in air for 1 through 100 hours, preferably 2 through 40 hours in order to activate the molybdenum additive and are then investigated for their luminescent property. The following measured values arose:

| Example | Additive | Tempering | Relative Light Yield | Afterglow Intensity |
|---------|----------|-----------|---------------------|---------------------|
| -1-     |          | without   | 1.00                | $10^{-3.4}$         |
|         | without  | with      | 1.05                | $10^{-3.5}$         |
| -2-     |          | without   | 1.00                | $10^{-3.8}$         |
|         | without  | with      | 0.92                | $10^{-4.0}$         |
| -3-     |          | without   | 1.00                | $10^{-3.1}$         |
|         | Mo       | with      | 1.16                | $10^{-4.2}$         |
| -4-     |          | without   | 1.00                | $10^{-3.4}$         |
|         | Mo       | with      | 1.14                | $10^{-4.2}$         |

It can be seen that the properties of the phosphor ceramics without molybdenum additives can only be slightly improved or modified with a subsequent tempering. In exemplary embodiment 2, which exhibits an afterglow intensity of $10^{-3.8}$ after approximately 5 msec, a reduction of the light yield by 8% is observed, this being disadvantageous for employment of the ceramic in a radiation detector. The molybdenum-containing phosphor ceramic, by contrast, can be greatly influenced by tempering. Proceeding from an intensity value of $10^{-3.1}$ before the tempering, the tempering treatment of a molybdenum-containing phosphor ceramic leads, for example, to a reduction of the afterglow intensity to an intensity value of $10^{-4.2}$ (after the tempering) 5 msec after the end of the irradiation. At the same time, the light yield of the tempered, molybdenum-containing phosphor ceramic has increased by 16% compared to the untempered phosphor ceramic.

As a result of the improved luminescent properties, the phosphor of the invention is particularly suitable for employment in an x-ray computed tomography apparatus.

Although modifications and changes may be suggested by those skilled in the art, it is the intention of the inventors to embody within the patent warranted hereon all changes and modifications as reasonably and properly come within the scope of their contribution to the art.

WE CLAIM AS OUR INVENTION:

1. A phosphor for a high energy radiation detector comprising a rare earth oxisulfide having a general sum formula $(M_{1-x}Ln_x)_2O_2S$, wherein M is at least one element selected from the group consisting of Y, La and Gd, Ln is for at least one element selected from the group consisting of Eu, Ce, Pr, Tb, Yb, Dy, Sm and Ho, and wherein $(2\times10^{-1}) \geq x \geq (1\times10^{-6})$, and which also contains molybdenum in a proportion between $10^{-1}$ and $10^{-6}$ mol percent for reducing the afterglow of said phosphor.

2. A phosphor as claimed in claim 1, wherein Ln comprises Ce and at least further element selected from the group consisting of Tb, Pr and Eu.

3. A phosphor as claimed to claim 1, comprising molybdenum in a proportion between $5\times10^{-2}$ and $1\times10^{-5}$ mol percent.

4. A method for manufacturing a phosphor ceramic having reduced afterglow, comprising the steps of:

preparing and homogenizing a pigment powder having a general sum formula $(M_{1-x}LN_xMO_v)_2O_2S$, whereby M is at least one element selected from the group consisting of Y, La and Gd, Ln is for at least one element selected from the group consisting of Eu, Ce, Pr, Tb, Yb, Dy, Sm and Ho, and wherein $(2\times10^{-1}) \geq x \geq (1\times10^{-6})$ and $(6\times10^{-3}) \geq v \geq (6\times10^{-8})$;

compressing the pigment powder under pressure and at a temperature above 1200° C., in an inert or reducing atmosphere to from a compressed ceramic; and tempering the compressed ceramic under oxidizing conditions at a temperature in a range between 600° through 900°.

5. A method as claimed in claim 4, wherein the step of tempering comprises tempering said compressed ceramic in air for a time span in a range from 1 through 100 hours.

6. A method as claimed in claim 4, wherein the pigment powder has a specific surface of at least 10 m2/g defined according to BET.

7. A method as claimed in claim 4, comprising the additional step of subjecting the phosphor ceramic after tempering to a controlled temperature treatment in a temperature range between 600° C. through 900° C. reducing conditions in order to set the afterglow to a higher value.

8. A phosphor for a high energy radiation detector comprising a rare earth oxisulfide with a molybdenum additive in a concentration range between $10^{-1}$ and $10^{-6}$ mol percent for reducing the afterglow.

* * * * *